A. LEWIS.
Running-Gears of Wagons.

No. 139,588.   Patented June 3, 1873.

Witnesses:   Inventor:

UNITED STATES PATENT OFFICE.

ANDREW LEWIS, OF MINNEAPOLIS, MINNESOTA.

IMPROVEMENT IN RUNNING-GEARS OF WAGONS.

Specification forming part of Letters Patent No. 139,588, dated June 3, 1873; application filed December 17, 1872.

*To all whom it may concern:*

Be it known that I, ANDREW LEWIS, of Minneapolis, in the county of Hennepin, in the State of Minnesota, have made certain Improvements in Wagons, of which the following is a specification:

The object of this invention is to produce a more perfect means of coupling the forward and hind axles of a wagon together, and allow them to have greater freedom of lateral play with relation to each other, and at the same time preserve their connection with each other; and it consists in the construction of the parts, and their combination with each other, to effect the object, as will more fully hereinafter be described.

Figure 1:
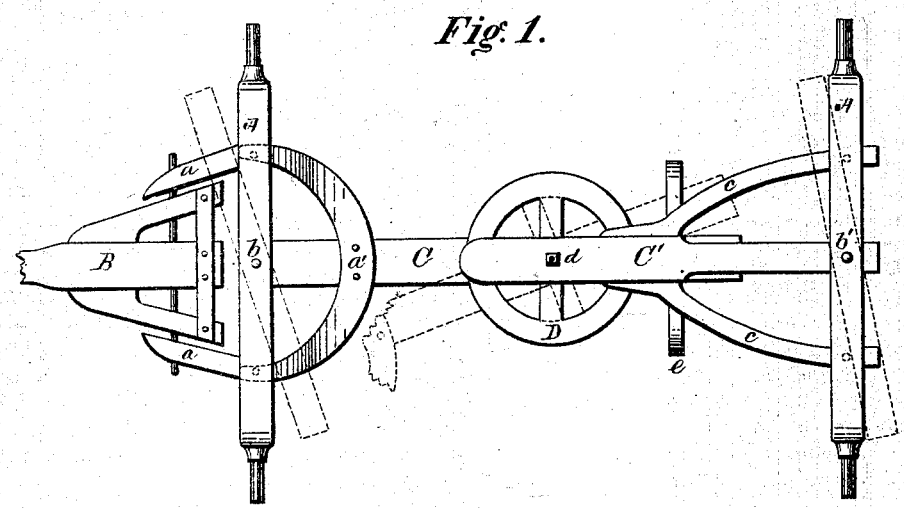
Figure 2:
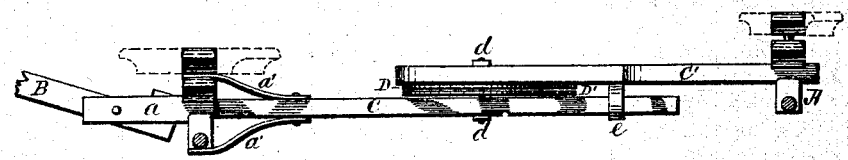

In the drawings, Figure 1 represents a top or plan view of wagon-gear; Fig. 2, a side view of the same; and Fig. 3 a modification of the same invention.

A A represent the axles; $a\ a$, the formal braces to attach the tongue B to; $a'\ a'$, metal braces from the forward bolster to the reach or perch. C is the forward part of the reach or perch, secured at its forward end between the forward bolster and axle by the king-bolt $b$ that passes through the bolster-reach C and forward axle A, and by bolting the curved braces $a'\ a'$ to the reach, and their ends to the bolster and axle, prevents the reach C from getting out of position with relation to the axle A. C' is the hind or rear part of the reach or perch; and is secured to the axle A by the bolt $b'$ and braces $c\ c$, which keeps the reach C' in proper position. D and D' are metal wheels or fifth-wheels. Wheel D is secured to the under side of the rear or hind part C of the reach, and wheel D' is secured to the upper side of the forward part C of the reach, and all are secured together by the bolt $d$, which passes through the forward end of part C', through the center of wheels D and D' and through part C, when it is secured by screw-nut or other fastening, as may be desired. The forward part C of the reach extends back further than where the two parts C and C' are connected by wheels D and D' together, and passes through an open link, $e$, that is secured to the under side of part C' of the reach, which holds the rear end of part C of the reach from falling, and will also limit the vibration of the forward axle in the turning around of the wagon.

Figure 3:
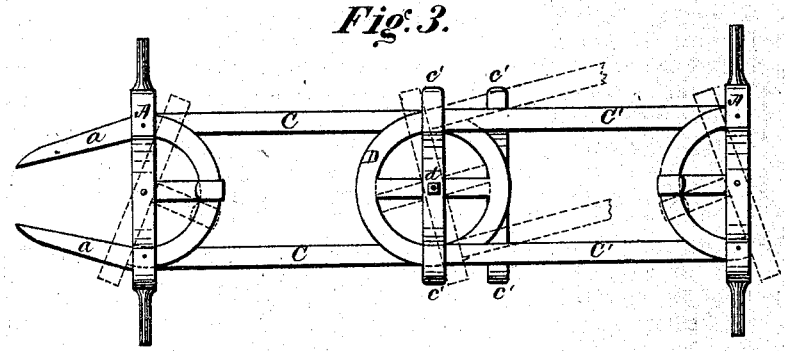

Fig. 3 shows a modification of the construction, but preserves the principle of operation, as applied to constructing each part of the reach in two separate parallel pieces, and the connecting fifth-wheels applied in the same manner and effecting the same result.

This mode of constructing the gear of a wagon allows the wagon to be turned around in a much shorter circle than can be done where the reach is whole and extends from the forward to the rear axle, and all the vibration is upon the king-bolts and the usually constructed fifth-wheels, as seen in Fig. 3.

Having thus described my invention, what I claim, and desire to secure by Letters Patent, is—

1. The combination of wheels D and D' with the parts C and C' of a reach or perch of a wagon, constructed to operate substantially in the manner and for the purpose described.

2. The combination of the parts C and C', wheels D and D', with the link $e$, substantially as and for the purpose described.

ANDREW × LEWIS.
his mark.

Witnesses:
CHAS. H. WOODS,
ROBERT S. BRYANT.